United States Patent [19]

Fagerburg et al.

[11] Patent Number: 4,499,262

[45] Date of Patent: Feb. 12, 1985

[54] PROCESS FOR THE PREPARATION OF SULFO-MODIFIED POLYESTERS

[75] Inventors: David R. Fagerburg; Finley E. McFarlane, both of Kingsport, Tenn.

[73] Assignee: Eastman Kodak Company, Rochester, N.Y.

[21] Appl. No.: 588,168

[22] Filed: Mar. 9, 1984

[51] Int. Cl.$^3$ .................. C08G 63/04; C08G 63/34
[52] U.S. Cl. .................. 528/279; 528/286; 528/295
[58] Field of Search .............. 528/279, 286, 295

[56] References Cited

U.S. PATENT DOCUMENTS

| | | | |
|---|---|---|---|
| 3,404,121 | 10/1968 | Barkey | 528/279 X |
| 3,907,754 | 9/1975 | Tershansy et al. | 528/279 X |
| 3,962,189 | 6/1976 | Russin et al. | 528/279 X |
| 3,965,071 | 6/1976 | McClelland | 528/279 |
| 4,208,527 | 6/1980 | Horlbeck et al. | 528/279 |
| 4,454,312 | 6/1984 | Kuze et al. | 528/286 X |

*Primary Examiner*—Lucille M. Phynes
*Attorney, Agent, or Firm*—Clyde L. Tootle; Gary C. Bailey; J. Frederick Thomsen

[57] ABSTRACT

Disclosed is a process for preparing sulfo-modified polyesters having an inherent viscosity of about 0.3 to about 0.9 and characterized by an improved planar stretch ratio relative to a given inherent viscosity, an improved rate of acetaldehyde generation relative to a given planar stretch ratio and increased buildup of melt viscosity. The process comprises the steps of (a) reacting (1) a dicarboxylic acid component comprising at least about 85 mole % terephthalic acid and about 0.1 to about 5.0 mole % of a difunctional sulfo-monomer, and (2) a glycol component comprising at least about 85 mole % ethylene glycol, the reaction being conducted in the presence of a catalyst system comprising a titanium compound and an organic salt of an alkali metal, (2) polycondensing the reaction product of step (1) in the presence of a phosphate ester until a polymer having the desired I.V. is obtained.

14 Claims, No Drawings

PROCESS FOR THE PREPARATION OF SULFO-MODIFIED POLYESTERS

BACKGROUND OF THE INVENTION

This invention relates to an improved process for the preparation of polyesters and more particularly to a process for producing sulfo-modified polyesters more rapidly as well as to producing sulfo-modified polyester material having improved properties.

The commercial packaging industry is finding an ever increasing use of polyester material, most important of which is poly(ethylene terephthalate). This polyester has various known qualities which make its use desirable for protecting comestibles including foodstuffs, beverages, medicines and the like, by enveloping in packages, e.g., molded containers. A particular type of molded container finding wide acceptance is the biaxially oriented container used in the beverage industry. Because of the continuing rise in popularity of such packages in recent years, most notably with the poly(ethylene terephthalate) beverage bottle, there is a need for improvement both in the production of such polyester material as well as in the properties of the polyester material and articles formed therefrom.

In particular, any modification to the method of manufacturing polyester material which will provide increased productivity without requiring additional production equipment and at the same time yield a polymer having improved properties would be welcomed by the industry.

A method has now been found for producing sulfo-modified polyesters more rapidly as well as for producing polyesters having improved properties.

Numerous patents disclose sulfonate monomers and copolyesters containing said monomers. See, for example, U.S. Pat. Nos. 3,634,541; 3,779,993; 3,018,272 and the patents cited therein. However, none of these patents disclose the preparation of the improved sulfo-modified polyesters described herein according to the process of this invention.

The sulfo-modified polyesters produced by the process of this invention are characterized by a more rapid build-up of melt viscosity compared to similar polyesters produced by previous methods. These polyesters are also characterized by improved planar stretch ratios relative to a given inherent viscosity. In addition, these polyesters exhibit significantly improved acetaldehyde generation rates relative to a given planar stretch ratio. Moreover, this process enables the production of these polyesters as well as various articles formed therefrom more rapidly and more economically than by previous methods.

SUMMARY OF THE INVENTION

According to the present invention there is provided a process for producing sulfo-modified polyesters which may be cast into a variety of shaped articles, including for example, films, sheets and containers. The process comprises the steps of
(a) reacting under polyester forming conditions
(1) a 100 mole % dicarboxylic acid component comprising at least about 85 mole % terephthalic acid or an ester-forming derivative thereof and about 0.1 to about 5.0 mole % of a difunctional sulfo-monomer containing at least one metal sulfonate group attached to an aromatic nucleus, wherein the functional groups are hydroxyalkoxy, carboxyl, or amino,
(2) a 100 mole % glycol component comprising at least about 85 mole % ethylene glycol,
the reaction being conducted in the presence of a catalyst system comprising a titanium compound and an organic salt of an alkali metal, the titanium compound being present in the amount of at least about 10 to about 60 ppm Ti based on the weight of the acid component of the polyester, and the organic salt being present in the amount, based on a sulfo-monomer content of 0.5 mole % or less, of at least 0.025 mole per mole of polymer with the amount of organic salt increasing proportionately from 0.025 mole to at least 0.250 mole per mole of polymer as the sulfo-monomer content increases from 0.5 mole % to 5.0 mole %, said sulfo-monomer content being based on a 100 mole % acid fraction;

(b) polycondensing the reaction product of step (a) in the presence of about 13 to about 240 ppm, based on the acid component of the polyester, of a phosphate ester, to obtain a polymer having an inherent viscosity of about 0.3 to about 0.9. The polyesters obtained by this process are further characterized by an improved critical planar stretch ratio relative to a given inherent viscosity and an improved rate of acetaldehyde generation relative to a given planar stretch ratio.

DETAILED DESCRIPTION OF THE INVENTION

The dicarboxylic acid component of these polyesters comprises at least about 85 mole % terephthalic acid and preferably from about 95 to about 99.9 mole %, based on a total acid fraction of the polymer of 100 mole %. Additional dicarboxylic acids which may be employed include, for example, isophthalic acid, 2,6-naphthalenedicarboxylic acid, adipic acid, 1,4-cyclohexanedicarboxylic acid and linear low alkyl dicarboxylic acids such as, for example, adipic, azelaic, maleic, fumaric, and glutaric acids. It should be noted that the term "acid" as used herein to define a polyester reactant includes esters or other reactive species such as anhydrides or the like. Preferred for this invention are lower alkanol esters of the free dicarboxylic acids, e.g., the dimethyl, diethyl or dipropyl ester.

It is essential to the improvements obtained by this invention that the polyester contains as part of the dicarboxylic acid component at least about 0.1 to about 5.0 mole % of a difunctional sulfo-monomer, based on a total acid fraction of 100 mole %, and preferably from about 0.1 to about 0.5 mole %. The difunctional sulfo-monomer component of the polyesters produced by this process contain at least one metal sulfonate group attached to an aromatic nucleus. The functional groups may be hydroxyalkoxy, carboxy, or amino. More particularly, the difunctional sulfo-monomer of these polyesters has a structure selected from

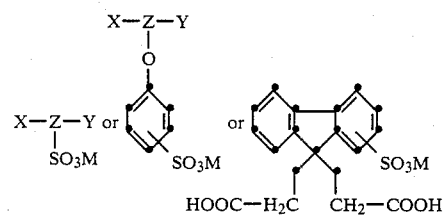

wherein M is a monovalent cation comprising an alkali metal, Z is a trivalent aromatic nucleus, and X and Y are each monovalent radicals individually selected from the functional groups previously described.

One or mixtures of the above described difunctional sulfo-monomers may be employed in the polyesters described herein. The preferred difunctional sulfo-monomer is a dicarboxylic acid or an ester thereof containing a metal sulfonate group. The ester of the sulfo-monomer component is highly preferred. The metal ion of the sulfonate salt represented by M in the above formula, may be of the alkali metals, e.g., sodium, lithium and potassium. The divalent and trivalent metals of the sulfonate salts are to be avoided due to their tendency to form ether glycol degradation products, such as diethylene glycol.

Examples of difunctional sulfo-monomers suitable for the process of this invention include 5-sodiosulfoisophthalic acid, 4-sodiosulfoisophthalic acid, 5-(4-sodiosulfo)phenoxy isophthalic acid, and 2-(sodiosulfo)-9,9-fluorenbis-(propionic acid). Most preferred of these is 5-sodiosulfoisophthalic acid and its dialkyl ester.

The difunctional sulfo-monomers employed in these polyesters and their preparation are known in the art. See, for example, U.S. Pat. Nos. 3,779,993 and 3,018,272, the disclosures of which are hereby incorporated by reference.

It should be noted that the total acid fraction of the polyesters of this invention consists of at least about 85 to about 99.9 mole % of terephthalic acid, at least about 0.1 to about 5.0 mole % of a difunctional sulfo-monomer with the difference of up to a total acid fraction of 100 mole % being made up of one or more dicarboxylic acids described previously.

The glycol component of these polyesters comprises at least about 85 mole % ethylene glycol based on a total glycol content of 100 mole %. Other glycols having up to about 8 carbon atoms may be employed in amounts up to about 15 mole %. These glycols are well known in the art and include, for example, 1,4-butanediol, 1,6-hexanediol, 1,4-cyclohexanedimethanol, 2,2-dimethyl-1,3-propanediol, etc. Additionally, diethylene glycol may be present in these polyesters in an amount up to about 3.0 weight % based on a total polymer weight of 100%.

The polyesters described herein above are prepared in accordance with the well known two-stage process, involving an esterification or transesterification step, depending on the starting materials, followed by a polycondensation step with the reaction being done in a melt condition. Temperatures employed will ordinarily range from about 160° C. to about 300° C. The transesterification or esterification portion of this invention will normally be carried out at elevated pressure with the polycondensation stage being conducted under a reduced pressure or at atmospheric pressure under an inert atmosphere. The difunctional sulfo-monomer may be added in amounts as described above directly to the reaction mixture from which the polyester is made.

The process of this invention requires that the esterification or transesterification step, depending on the starting material, be carried out in the presence of a catalyst system comprising a titanium compound and an organic acid salt. The titanium compound will be employed in an amount sufficient to provide at least about 10 parts of titanium metal per million pats of the acid fraction of the polyester. Preferably, the titanium compound is employed in the amount of about 10 to about 60 ppm Ti based on the acid fraction of the polymer. The titanium compounds preferred are the titanium alkoxides. Examples of these include acetyl triisopropyl titanate, titanium tetraisopropoxide titanium glycolates, titanium butoxide, hexylene glycol titanate, and tetraisooctyl titanate.

One or more additional metal-containing compounds may also be employed in mixture with the previously described titanium compounds. Included among these are, for example, manganese, zinc, cobalt, calcium, antimony, germanium, gallium and tin. Preferred are the organic or inorganic salts of manganese and cobalt and certain antimony compounds. The amount of such additional metal compounds may vary, but preferably will range from about 20-200 ppm Mn for the manganese salt, from about 5-100 ppm Co for the cobalt salt, and from about 50-300 ppm Sb for the antimony compound. Examples of suitable manganese salts include manganous benzoate tetrahydrate, manganese chloride, manganese oxide, manganese acetate, manganese acetylacetonate, manganese succinate, manganese diethyldithiocarbamate, manganese antimonate, manganic phosphate monohydrate, manganese glycoloxide, manganese naphthenate and manganese salicyl salicylate.

Examples of suitable cobalt salts include cobaltous acetate trihydrate, cobaltous nitrate, cobaltous chloride, cobalt acetylacetonate, cobalt naphthenate and cobalt salicyl salicylate.

Examples of suitable antimony compounds include antimony metal or metal alloys; antimony III and V halides, hydroxides and sulfides; antimony III, IV and V oxides; antimony salts of carboxylic acids such as acetate, lactate, oxalate, phthalate or benzoate; antimony III and V glycolates; and antimony alcoholates.

The catalyst system further comprises an organic acid salt. Suitable organic acid salts are those containing an alkali metal cation and an anion derived from an organic acid having up to three carboxylic acid groups and optionally a single hydroxyl group or a halogen atom as a substituent on the organic anion. The carboxylic acid may be either aromatic, aliphatic, or a combination thereof. The pKa of the organic acid from which the salt is derived should be between the limits of about 0.7 to about 5.5. Some examples of suitable salts include the lithium, sodium, potassium, or cesium salts of, for example, acetic, propionic, butyric, pentanoic, hexanoic, 2-ethylhexanoic, benzoic, citric, salicylic, and chloroacetic acids. Mixtures of the salts may be used, but generally confer no special advantage. Preferred salts are sodium acetate, potassium acetate, and cesium acetate. The amount of organic salt may range from 0.025 mole up to about 1.0 mole per mole of polymer, the specific amount depending on the sulfo-monomer content of the polymer. For a sulfo-monomer content of 0.5 mole % or less the amount of organic salt will be at least 0.025 mole per mole of polymer. At sulfo-monomer levels of 0.5 mole % up to 5.0 mole % he required minimum amount of organic salt increases proportionately from 0.025 mole to 0.250 mole per mole of polymer, the sulfo-monomer content being based on a total acid fraction of 100 mole %. The specific quantity of organic salt for sulfo-monomer levels of 0.5 mole % and higher may be calculated from the equation $$A > 0.025 + 0.05 (S - 0.5)$$

wherein A is the organic salt expressed as mole per mole of polymer, and S is the sulfo-monomer content of the polymer. Thus, for a polymer containing, for example, 1.0 mole % sulfo-monomer, the amount of organic salt will be at least 0.05 mole per mole of polymer.

The process of this invention requires that the polycondensation step be carried out in the presence of a phosphate ester. This is achieved by adding the phosphate ester to the reaction product obtained in the esterification or transesterification step and polycondensing the reaction product until a polymer of the desired inherent viscosity is obtained. The preferred phosphate ester has the formula

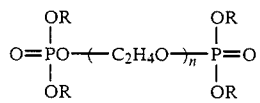

wherein n has an average value of 1.5 to about 3.0 with about 1.8 being most preferred and each R is hydrogen or an alkyl radical having from 6 to 10 carbon atoms with octyl being most preferred, the ratio of the number of R groups of hydrogen atoms to the number of phosphorus atoms being about 0.25 to 0.50 with about 0.35 being most preferred; and the ester having a free acidity equivalent of about 0.2 to 0.5, the ester being present in the amount to provide phosphorus in the amounts of 13–240 parts per million based on the acid fraction of the polyester to be produced. Other phosphate esters useful in this invention include ethyl acid phosphate, diethyl acid phosphate, triethyl acid phosphate, arylalkyl phosphates, tri-2-ethylhexyl phosphate and the like. The phosphate ester may be used in an amount to provide phosphorus at a concentration such that the atom ratio of the amount of phosphorus to the sum of the amounts of catalyst metals (exclusive of antimony) is between 0.5 and 2.0 i.e., $$0.5 < \frac{[P]}{[\text{catalyst metals}]} < 2.0$$

where [ ] refers to the number of gram atoms of respective components. (Gram atoms of any element = weight of the element in grams minus the atomic weight of the element in grams).

The inherent viscosity (I.V.), of the polyesters herein can vary over a wide range depending on the balance of planar stretch ratio and melt viscosity desired. The I.V. will be at least about 0.3 and preferably from about 0.3 to about 0.9, the actual I.V. depending in part on the level of sulfo-monomer present.

As used herein, the inherent viscosity (I.V.) of the polyesters herein is determined according to ASTM D2857-70 procedure in a Wagner Viscometer of Lab Glass Inc. of Vineland, N.J. having a ½ ml. capillary bulb, using a polymer concentration of 0.5% by weight in 60/40, phenol/tetrachloroethane, by weight. The procedure is carried out by heating the polymer-solvent system at 120° C. for 15 minutes, cooling the solution to 25° C. and measuring the time of flow at 25° C. The I.V. is calculated from the equation $$n^{25°\,C.}_{0.50\%} = \frac{\ln \frac{t_s}{t_o}}{C}$$

wherein:

n = inherent viscosity at 25° C. at a polymer concentration of 0.50 g./100 ml. of solvent;
ln = natural logarithm;
$t_s$ = sample flow time;
$t_o$ = solvent-blank flow time; and
C = concentration of polymer in grams per 100 ml. of solvent = 0.50.

Various additives which do not adversely affect the polyesters described herein may also be incorporated into the polyester material. Some of these include antioxidant stabilizers, colorants, lubricants, mold releasing agents, etc., as well as various other additives all of which are well known in the art.

An especially preferred embodiment of this invention comprises reacting about 99 to 99.9 mole % dimethylterephthalate, about 0.1 to 0.5 mole % dimethyl-5-sodiosulfoisophthalate and a glycol comprising ethylene glycol, from 0 to about 30 mole % 1,4-cyclohexanedimethanol, based on 100 mole % total glycol, and up to about 2.0 weight % diethylene glycol based on a total polymer weight of 100%, in the presence of a catalyst system comprising a titanium alkoxide, a mixture of salts of manganese and cobalt, an antimony compound and sodium acetate, the manganese salt being present in the amount of about 40–70 ppm Mn, the cobalt salt being present in the amount of about 30–100 ppm Co, the titanium alkoxide being present in the amount of about 20–50 ppm Ti; the antimony compound being present in the amount of about 179–275 ppm Sb; and sodium acetate being present in the amount of at least about 0.025 to about 1.0 mole per mole of polymer and wherein the amount of the sodium acetate increases proportionately with the sulfo-monomer content of the polymers as described previously hereinabove, followed by polycondensing in the presence of a phosphate ester as previously described until a polymer of the desired I.V. is obtained.

The process of this invention is particularly advantageous since the sulfo-modified polyesters exhibit a more rapid buildup of melt viscosity during preparation than polyesters produced by previous methods. As a result, production in a polyester reactor is faster. For example, a sulfo-modified poly(ethylene terephthalate) containing about 1 mole percent of a difunctional sulfomonomer produced according to the process described herein exhibits about a 25–50% rate increase in a meltphase reactor. Since the final I.V. of the polyester will be equal to or less than polyesters produced by previous methods the overall production rate is faster. As will be readily apparent, this provides a definite advantage in the cost of producing the polyesters.

The polyesters obtained by this process also have an improved planar stretch ratio which results in increased production rates for the polyester material and for articles formed therefrom. The improved planar stretch ratio is manifested in a lower critical planar stretch ratio. While it is known that lower critical planar stretch ratios can be achieved by polycondensing the polyester material to a higher inherent viscosity this method requires a longer production rate or an increase in the number or size of reactors. Moreover, the increased process time makes obtaining a material with acceptable color more difficult since polyester material is subject to yellowing, the degree of yellowing directly correlated with reaction time. The polyesters produced by the process of this invention can therefore be obtained at a lower cost.

As used herein, the term "planar stretch ratio" is generally defined as the product of the stretch ratios of each of two directions of stretch (machine direction and transverse direction in film or sheet formation or axial and hoop directions in bottle formation). Thus, for a film stretched three times in each direction (machine and transverse direction or axial and hoop direction) so that the final lengths are three times the initial lengths, the planar stretch ratio would be 3×3 or 9. Critical planar stretch ratio is the planar stretch ratio at the point in the stress strain curve of a material at which strain hardening begins. It is in the design and manufacture of parisons from which containers such as beverage bottles are made that the critical planar stretch ratio is important. Thus, by multiplying the critical planar stretch ratio by the bottle-wall thickness desired the parison thickness necessary to make a bottle having that wall thickness can be determined. It therefore follows that if a material to be used in making parisons can be obtained so as to have a critical planar stretch ratio lower than that previously employed, the parison could be designed thinner and longer. Because heat transfer is known to be directly related to the square of the thickness of the molded article, the time ordinarily required in molding articles will be reduced with the use of thermoplastic material having a lower critical planar stretch ratio. A reduced molding cycle time in turn results in increased productivity and decreased costs for the manufacturer.

The polyesters produced by this process are also characterized by a lower rate of acetaldehyde generation for a given planar stretch ratio compared to polyesters produced by previous methods. This is an important property for polyester material employed in articles used for packaging comestibles, including, for example, food items, beverages and pharmaceuticals.

The polyesters are suitable for casting into various shaped articles, by methods well known in the art. They may be molded into film, sheets and containers, especially biaxially oriented extrusion molded containers, the method for preparation of which is shown in U.S. Pat. No. 3,733,309.

The following examples are given to further illustrate the invention, but it is to be unerstood that the invention is not to be limited in any way by the details described therein.

EXAMPLE 1

This example illustrates the lower critical planar stretch ratio obtained with poly(ethylene terephthalate) modified with a difunctional sulfo-monomer and prepared by the process described herein compared to unmodified poly(ethylene terephthalate) having the same I.V. A continuous reactor was fed with the proper amounts of dimethylterephthalate, ethylene glycol, dimethyl 5-sodiosulfoisophthalate, and catalyst metals to produce about 20 pounds/hour of product copolymer. The catalyst metals were controlled at about 35 ppm Ti, 105 ppm Co, 48 ppm Mn, 240 ppm Sb, and 125 ppm P. Sodium acetate was added to the reactants at a level of 0.1 mol per mol of sulfo-monomer. The reactor consisted of three stirred pots in series followed by a tray reactor and a sloped tray reactor. The temperatures and pressures or the reactors were, respectively: 240° C., 40 psig; 240° C., 30 psig; 255° C., 150 torr; 275°–280° C., 5.0 torr; and 280° C., 1.4–4.0 torr. The last reactor pressure was varied to maintain the desired product I.V.

The melt-phase material was stranded and chopped and then crystallized in a hot air oven at ~180° C. The material was then solid-state polymerized in a bed using nitrogen gas flow, the gas being heated to 215° C.

By the above means, a series of I.V.'s at different sulfo-monomer levels were made. Films (20 mil) were then extruded at 280°–290° C. onto a 120° F. roll and cut into 4 inch by 4 inch squares. These were stretched at a rate of ~12–14 inches/second in both x- and y-directions on a T. M. Long film stretcher at 90° C. air temperature. The total energy under the force-displacement curve was then tabulated versus I.V. at sulfo-monomer level.

| Composition | I.V., Energy | I.V., Energy | I.V., Energy |
|---|---|---|---|
| A | 0.67, 2410 | 0.70, 3120 | 0.81, 3090 |
| B | 0.63, 2380 | 0.68, 2920 | 0.77, 3300 |
| C | 0.57, 2410 | 0.65, 3000 | 0.69, 3180 |
| D | 0.48, 2660 | 0.54, 3200 | 0.58, 3220 |

A = 100 mole % dimethylterephthalate (DMT)
B = 99.5 mole % DMT and 0.5 mole % dimethyl-5-sodiosulfoisophthalate (sulfo-monomer)
C = 99.0 mole % DMT and 1.0 mole % sulfo-monomer
D = 98.0 mole % DMT and 2.0 mole % sulfo-monomer Comparison of the above data reveals the higher total energy (related directly to lower critical planar stretch ratio) for lower I.V. with sulfo-monomer present.

EXAMPLE 2

This example illustrates that modification of poly(ethylene terephthalate) normally results in a higher planar stretch ratio. Polyesters were prepared as in the method of Example 1 but instead of using 5-sodiosulfoisophthalic acid, 1,4-cyclohexanedimethanol was used. Two polyesters were thus prepared, (1) poly(ethylene terephthalate) (PET) (to act as a control) and (2) poly(ethylene terephthalate) modified with 0.5 mol % of 1,4-cyclohexanedimethanol (CHDM). Twenty mil thick film was extruded and stretched in a TM Long film stretcher as in Example 1. Total energy under the curve was determined.

| Composition | I.V., dl/g. | Total Energy |
|---|---|---|
| PET | 0.583 | 1448 |
| PET with 0.5 mol % CHDM | 0.610 | 1321 |

Even though the modified PET was of a lower I.V. and therefore would have a lower total energy than at the I.V. level of the modified PET, the unmodified PET's total energy was still higher than the modified PET indicating a lower planar stretch ratio for the PET. This is the opposite effect to that seen with the 5-سsodiosulfoisophthalate modification shown in Example 1.

EXAMPLE 3

This example further illustrates the normal increase in planar stretch ratio with copolymer modification. A PET and a CHDM modified PET were made as in Example 1. Data from the TM Long stretching experiment showed the following:

| Composition | Starting I.V., dl/g | Total Energy |
|---|---|---|
| PET | 0.72 | 3013 |
| PET with 3.5 | 0.76 | 2770 |

| Composition | Starting I.V., dl/g | Total Energy |
|---|---|---|
| mol % CHDM | | |

Here again, the planar stretch ratio of the PET would be lower even though it had a lower I.V. than the copolymer.

EXAMPLE 4

This example illustrates the lower acetaldehyde generation rate of the polyesters of this invention as measured by the headspace acetaldehyde obtained in a 2 liter bottle. Continuous reactor runs were made with two polyester samples: (1) poly(ethylene terephthalate), 0.72 dl/g I.V. (solid stated material) which contained 35 ppm titanium derived from the tetraisopropoxide catalyst and 120 ppm of phosphorous derived from a phosphate ester as disclosed in U.S. Pat. No. 4,010,145 along with manganese (48 ppm), cobalt (100 ppm), and antimony (250 ppm) catalyst metals, and (2) poly(ethylene terephthalate) modified with 1 mole % of 5-sodiosulfoisophthalic acid (derived from the dimethyl ester) and containing 0.1 mol of sodium acetate per mol of sulfonic acid salt, 0.68 dl/g I.V. (solid stated material), having the same catalyst system. Fifty seven gram weight parisons were injection molded on a Lombard machine into a four cavity mold. Two liter bottles were blown from the parisons by standard means, the bottles flushed 30 sec. with nitrogen gas, the bottles capped, and the acetaldehyde level determined by gas chromatography after storage for 24 hrs. at room temperature. Acetaldehyde vs. polymer melt temperature results are given below:

| | Polymer 1 | Polymer 2 |
|---|---|---|
| Melt temperature, °F. | 535 | 533 |
| Acetaldehyde, μg/l | 3.8 | 2.7 |
| Melt temperature, °F. | 43 | 540 |
| Acetaldehyde, μg/l | 4.2 | 3.1 |
| Melt temperature, °F. | 553 | 550 |
| Acetaldehyde, μg/l | 5.2 | 4.1 |
| Melt temperature, °F. | 560 | 558 |
| Aceetaldehyde, μg/l | 7.2 | 5.6 |

EXAMPLE 5

Poly(ethylene terephthalate) containing 0.5 mol percent of 5-sodiosulfoisophthalic acid and using 0.10 mol of sodium acetate per mole of sulfonic acid salt was prepared to ca 0.60 I.V. in a continuous reactor system. The catalyst metals analyzed as follows (ppm): Ti—45, Mn—44, Co—105, Sb—229, and P—133. This material was solid-phase polymerized to 0.68 I.V. A comparison sample of poly(ethylene terephthalate), i.e., containing no sulfo-monomer and omitting the use of sodium acetate, 0.72 I.V., was also prepared as a control and was analyzed to have the following catalyst metals (ppm): Ti—12, Mn—65, Co—62, Sb—244, and P—80. The headspace acetaldehyde results are given below:

| | Sulfo-Modified PET | Unmodified PET |
|---|---|---|
| Melt temperature, °F. | 540 | 538 |
| Acetaldehyde, μg/l | 2.278 | 2.21 |
| Melt temperature, °F. | 550 | 550 |
| Acetaldehyde, μg/l | 2.88 | 3.28 |
| Melt temperature, °F. | 559 | 559 |
| Acetaldehyde, μg/l | 3.77 | 3.94 |
| Melt temperature, °F. | 568 | 565 |
| Aceetaldehyde, μg/l | 4.84 | 5.41 |

It is apparent that acetaldehyde values for the sulfo-modified material were consistantly lower than for the control, even though the level of titanium catalyst was substantially higher for the sulfo-material which should have lead to much higher acetaldehyde values.

EXAMPLE 6

Two samples of poly(ethylene terephthalate) containing 0.5 mol percent of 5-sodiosulfoisophthalic acid and 3.5 mol percent of 1,4-cyclohexanedimethanol, and using 0.10 mole of sodium acetate in one and 0.05 mole in the other, per mole of sulfonic acid salt, were prepared to ca 0.58 I.V. in a continuous reactor system. These materials were solid-phase polymerized to 0.73 and 0.69 I.V. respectively (relative to acetate content). A control poly(ethylene terephthalate) containing 3.5 mol percent 1,4-cyclohexanedimethanol, having an I.V. of 0.80, was also prepared without the use of the sodium acetate. Catalyst systems for each analyzed as follows:

| | 0.05 Acetate | 0.10 Acetate | Control |
|---|---|---|---|
| Ti | 34 | 36 | 11 |
| Mn | 52 | 54 | 58 |
| Co | 54 | 53 | 96 |
| Sb | 272 | 244 | 246 |
| P | 88 | 90 | 87 |

Headspace acetaldehyde results are given below:

| | 0.05 Acetate | 0.10 Acetate | Control |
|---|---|---|---|
| Melt temperature, °F. | 562 | 562 | 560 |
| Acetaldehyde, μg/l | 2.07 | 2.46 | 3.60 |
| Melt temperature, °F. | 575 | 576 | 574 |
| Acetaldehyde, μg/l | 2.91 | 3.59 | 4.86 |
| Melt temperature, °F. | 585 | 586 | 588 |
| Acetaldehyde, μg/l | 3.85 | 5.26 | 7.00 |

It is apparent that acetaldehyde values for the two sulfo-materials were consistantly lower than for the control, even though, as above, the level of titanium catalyst in the control was substantially lower than for the sulfo-materials.

EXAMPLE 7

Poly(ethylene terephthalate) containing 0.5 mol percent of 5-sodiosulfoisophthalic acid and 0.05 mol of sodium citrate per mole of sulfo-monomer was prepared in a continuous reactor system and solid phase polymerized to 0.69 I.V. The catalyst system analyzed as follows (ppm): Ti—32, Mn—47, Co—47, Sb—214, and P—82. The control PET was that for Example 1. Headspace acetaldehyde measurements were as follows:

| | Sulfo-Material | PET Control |
|---|---|---|
| Melt temperature, °F. | 538 | 532 |
| Acetaldehyde, μg/l | 1.91 | 2.06 |

-continued

| | Sulfo-Material | PET Control |
|---|---|---|
| Melt temperature, °F. | 550 | 546 |
| Acetaldehyde, μg/l | 2.54 | 2.84 |

As in previous examples, even with higher titanium catalyst levels for the sulfo-materials, the acetaldehyde values were lower than for the control sample.

The lower acetaldehyde in the bottle for the sulfo-monomer-containing polyester is apparent throughout the entire temperature range of the experiment.

The invention has been described in detail with particular reference to preferred embodiments thereof, but it will be understood that variations and modifications can be effected within the spirit and scope of the invention.

We claim:

1. A process for the preparation of a sulfo-modified polyester comprising
   (a) reacting under polyester forming conditions (1) a 100 mole % dicarboxylic acid component comprising at least about 85 mole % terephthalic acid or an ester-forming derivative thereof and about 0.1 to about 5.0 mole % of a difunctional sulfo-monomer containing at least one metal sulfonate group attached to an aromatic nucleus, the functional groups being hydroxyalkoxy, carboxy or amine, and (2) a 100 mole % glycol component comprising at least about 85 mole % ethylene glycol, the reaction being conducted in the presence of a catalyst system comprising a titanium compound and an organic salt of an alkali metal, the titanium being present in the amount of at least about 10 to about 60 ppm based on the acid component of the polyester and the organic salt being present in the amount, based on a sulfo-monomer content of 0.5 mole % or less, of at least 0.025 mole per mole of polymer with the amount of organic salt increasing proportionately from 0.025 mole to at least 0.250 mole per mole of polymer as the sulfo-monomer content increases from 0.5 mole % to 5.0 mole %, said sulfo-monomer content being based on a 100 mole % acid fraction,
   (b) polycondensing the reaction product of step (a) in the presence of about 13 to about 240 ppm, based on the acid component of the polyester, of a phosphate ester to obtain a polymer having an inherent viscosity of about 0.3 to about 0.9 and characterized by an improved critical planar stretch ratio relative to a given inherent viscosity and an improved rate of acetaldehyde generation relative to a given planar stretch ratio.

2. The process of claim 1 wherein said catalyst system comprises a titanium compound and optionally one or a mixture of a manganese salt, a cobalt salt and an antimony compound, the titanium compound being present in the amount of about 10 to about 60 ppm Ti, the manganese salt being present in the amount of about 20 to about 200 ppm Mn, the cobalt salt being present in the amount of about 5 to about 100 ppm Co, and the antimony compound being present in the amount of about 50 to about 300 ppm Sb, and wherein said catalyst system also comprises an organic salt of an alkali metal, the organic salt being present in the amount, based on a sulfo-monomer content of 0.5 mole % or less, of at least 0.025 mole per mole of polymer with the amount of organic salt increasing proportionately from 0.025 mole to at least 0.250 mole per mole of polymer as the sulfo-monomer content increases from 0.5 mole % to 5.0 mole %, said sulfo-monomer content being based on a 100 mole % acid fraction.

3. The process of claim 2 wherein said titanium compound is a titanium alkoxide selected from the group consisting of acetyl triisopropyl titanate, titanium tetraisopropoxide, titanium glycolates, titanium butoxide, hexylene glycol titanate, and tetraisooctyl titanate.

4. The process of claim 1 wherein the alkali metal of said organic salt is lithium, sodium, potassium or cesium and said organic acid is selected from the group consisting of acetic, propionic, butyric, pentanoic, hexanoic, 2-ethylhexanoic, benzoic, citric, salicylic, and chloroacetic acids.

5. The process of claim 1 wherein said phosphate ester is selected from ethyl acid phosphate, diethyl acid phosphate, triethyl acid phosphate, aryl alkyl phosphate, tris-2-ethylhexylphsophate, and a phosphate ester having the formula

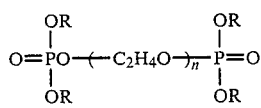

wherein n has an average value of about 1.5 to about 3.0 and each R is hydrogen or an alkyl radical having from 6 to 10 carbon atoms, the ratio of the number of R groups of hydrogen atoms to the number of phosphorus atoms being about 0.25 to 0.50, and the ester has a free acidity equivalent of about 0.2 to 0.5.

6. The process of claim 1 wherein said difunctional sulfo-monomer is selected from the group consisting of 5-sodiosulfoisophthalic acid, 4-sodiosulfoisophthalic acid, 5-(4-sodiosulfo)phenoxy isophthalic acid, 2-(sodiosulfo)-9,9-fluorenbis-(propionic acid), and dialkyl esters thereof.

7. The process of claim 1 wherein said glycol component comprises ethylene glycol, up to about 15 mole % 1,4-cyclohexanedimethanol, based on 100 mole % glycol content, and from 0 to about 2 weight %, based on total polymer weight of 100 weight %, diethylene glycol.

8. The process of claim 1 comprising about 99.5 to about 99.9 mole % terephthalic acid or dimethylterephthalate and about 0.5 to about 0.1 mole % of said difunctional sulfo-monomer.

9. A polyester material prepared according to the process of claim 1.

10. A polyester material prepared according to the process of claim 7.

11. A molded article formed from the polyester material of claim 9.

12. A molded article formed from the polyester material of claim 10.

13. A biaxially oriented container formed from the polyester material of claim 9.

14. A biaxially oriented container formed from the polyester material of claim 10.

* * * * *